United States Patent
Jung et al.

(10) Patent No.: US 7,269,352 B2
(45) Date of Patent: Sep. 11, 2007

(54) WAVELENGTH DIVISION MULTIPLEXING LIGHT SOURCE APPARATUS USING SEMICONDUCTOR OPTICAL AMPLIFIER

(75) Inventors: Dae-Kwang Jung, Suwon-shi (KR); Yun-Je Oh, Yongin-shi (KR); Seong-Taek Hwang, Pyongtaek-shi (KR)

(73) Assignee: Samsung Electronics, Co., Ltd., Suwon, Gyeonggi-Do (KR)

( * ) Notice: Subject to any disclaimer, the term of this patent is extended or adjusted under 35 U.S.C. 154(b) by 679 days.

(21) Appl. No.: 10/688,568

(22) Filed: Oct. 17, 2003

(65) Prior Publication Data

US 2004/0179843 A1    Sep. 16, 2004

(30) Foreign Application Priority Data

Mar. 10, 2003   (KR) .................. 10-2003-0014846

(51) Int. Cl.
*H04J 14/02* (2006.01)
(52) U.S. Cl. .......................... 398/79; 398/82
(58) Field of Classification Search ................ 398/79, 398/82, 42, 43, 101, 160; 359/618, 633, 359/634, 337.12, 627
See application file for complete search history.

(56) References Cited

U.S. PATENT DOCUMENTS

2001/0030810 A1* 10/2001 Gaebe ...................... 359/584
2002/0159688 A1* 10/2002 Kim et al. .................. 385/24
2003/0007207 A1* 1/2003 Healey et al. ............. 359/124

\* cited by examiner

*Primary Examiner*—M. R. Sedighian
(74) *Attorney, Agent, or Firm*—Cha & Reiter, LLC

(57) ABSTRACT

A WDM (Wavelength Division Multiplexing) light source apparatus using a SOA (Semiconductor Optical Amplifier) is disclosed. The WDM light source apparatus includes N SOAs, a 1×N multiplexer/demultiplexer, and a reflective mirror. The N SOAs have one end coated with a substance of a first reflection factor and the other end coated with a substance of a second reflection factor, directly modulate their input signals into optical signals according to a high-speed data signal to be transmitted, and amplify the modulated signal. The 1×N multiplexer/demultiplexer has one end composed of N terminals and the other end composed of one terminal. The N terminals are coupled with the N SOAs. The reflective mirror having a high reflection factor is connected to one terminal of the 1×N multiplexer/demultiplexer to reflect a signal received from the 1×N multiplexer/demultiplexer.

5 Claims, 3 Drawing Sheets

WAVELENGTH DIVISION MULTIPLEXING LIGHT SOURCE APPARATUS USING SEMICONDUCTOR OPTICAL AMPLIFIER

CLAIM OF PRIORITY

This application claims priority to an application entitled "WDM-PASSIVE OPTICAL NETWORK CAPABLE OF INTEGRATING BROADCAST AND COMMUNICATION," filed in the Korean Intellectual Property Office on Mar. 10, 2003 and assigned Serial No. 2003-14846, the contents of which are hereby incorporated by reference.

BACKGROUND OF THE INVENTION

1. Field of the Invention

The present invention relates to a WDM (Wavelength Division Multiplexing)-PON (Passive Optical Network) system, and more particularly to a WDM light source apparatus.

2. Description of the Related Art

Typically, a WDM-PON system provides subscribers with super high-speed broadband communication service using unique wavelengths assigned to each subscriber. Using such a configuration, WDM-PON systems can (1) guarantee communication confidentiality, (2) accommodate additional communication service requests from individual subscribers or increased communication capacity, and (3) increase the number of subscribers by further including a unique wavelength to be assigned to a new subscriber.

However, such WDM-PON systems must use the selected light source of a specified wavelength and an additional wavelength stabilizer to stabilize the light source of a specified lasing wavelength at a CO (Central Office) and individual subscriber ends This results in a high cost of use that is assessed to the subscriber. Because of these financial costs, such WDM-PON systems are not commercially available.

Several conventional light sources for WDM systems are known. These include a DFB (Distributed FeedBack) laser array, a MFL (Multi-Frequency Laser), a spectrum-sliced light source, and a mode-locked Fabry-Perot laser with incoherent light, etc. as WDM light sources.

The DFB laser array and the MFL are manufactured in a complicated process, and are high-priced elements that must select a correct wavelength and stabilize a wavelength so as to implement a WDM scheme.

The mode-locked Fabry-Perot laser with incoherent light performs spectrum-slicing on a broadband optical signal created from an incoherent light source such as an LED and an optical fiber amplifier light source, etc. using an optical filter or a WGR (Waveguide Grating Router). The spectrum-sliced broadband optical signal is injected into a Fabry-Perot laser having no isolator. The resultant mode-locked signal is then adapted to a signal transmission mode. If a spectrum-sliced signal of more than a predetermined output level is applied to the Fabry-Perot laser, the Fabry-Perot laser generates only a wavelength equal to that of the received spectrum-sliced signal.

The mode-locked Fabry-Perot (FP) laser with incoherent light directly modulates a low-priced Fabry-Perot laser signal according to a data signal, and is suitable for high-speed long distance transmission. However, in order to allow the Fabry-Perot laser to output a mode-locked signal suitable for high-speed long distance transmission, a high-output incoherent light signal having a wide bandwidth must be applied to the Fabry-Perot laser device. This requires that the Fabry-Perot laser use an expensive high-output broadband light source. Furthermore, there arises a mode hopping phenomenon arises in such lasers. Temperature variations may cause an output signal mode of the mode-locked Fabry-Perot (FP) laser is to change to another mode. When this phenomenon happens, data being transferred at a high speed may be lost.

Another light source is the spectrum-sliced light source. Such light sources perform spectrum-slicing on a broadband optical signal using a WGR (Waveguide Grating Router). This provides users with a large number of WDM channels. Attempts have been made to use an LED (Light Emitting Diode), a SLD (SuperLuminescent Diode), a FP (Fabry-Perot) laser, a fiber amplifier light source, and an ultra-short pulse light source as such a spectrum-sliced light source.

While an LED and an ultra LED proposed as such a spectrum-sliced light source have an optical bandwidth and are low-priced elements, these elements have a low modulation bandwidth and a low output level. Therefore, they may be appropriate as a light source for use with an upstream signal having a modulation rate lower than that of a downstream signal.

Also, while the Fabry-Perot laser is a low-priced high output element, it has a narrow bandwidth, such that it is impossible to provide a large number of wavelength division channels. Also when modulating and transmitting a spectrum-sliced signal at a high speed, the Fabry-Perot may have performance degradation due to a mode partition noise.

It is also noted that while the ultra-short pulse light source adapts a wide spectrum bandwidth as a spectrum bandwidth of a light source and has coherent characteristics, it has a low stability of a lasing spectrum and a narrow pulse width of several picoseconds (ps). This results in practical implementation difficulties.

Yet another possible WDN light source is a spectrum-sliced fiber amplifier light source. Such a light source provides a user with a large number of wavelength-division high-output channels by performing spectrum-slicing on the ASE light created from the optical fiber amplifier. However, this spectrum-sliced light source must use a high-priced external modulator such as a LiNbO3 to allow individual channels to transmit different data.

In conclusion, there is a need in the art for a cost-effective WDM light source apparatus applicable to WDM-PON systems.

SUMMARY OF THE INVENTION

One embodiment of the present invention is directed a WDM (Wavelength Division Multiplexing) light source apparatus using a semiconductor optical amplifier.

Another embodiment of the present invention is directed to a WDM (Wavelength Division Multiplexing) light source apparatus using a SOA (Semiconductor Optical Amplifier), including an N SOAs having one end coated with a substance having a high-reflection factor and the other end coated with a substance having an antireflection factor, directly modulating their input signals into optical signals according to a high-speed data signal to be transmitted, and amplifying the modulated signal, a 1×N multiplexer/demultiplexer having one end composed of N terminals and the other end composed of one terminal, which is connected to the N SOAs and the N terminals coupled with the N SOAs to multiplex its input signal, and a reflective mirror having a high reflection factor, connected to one terminal of the other end of the 1×N multiplexer/demultiplexer, for reflecting a signal received from the 1×N multiplexer/demultiplexer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
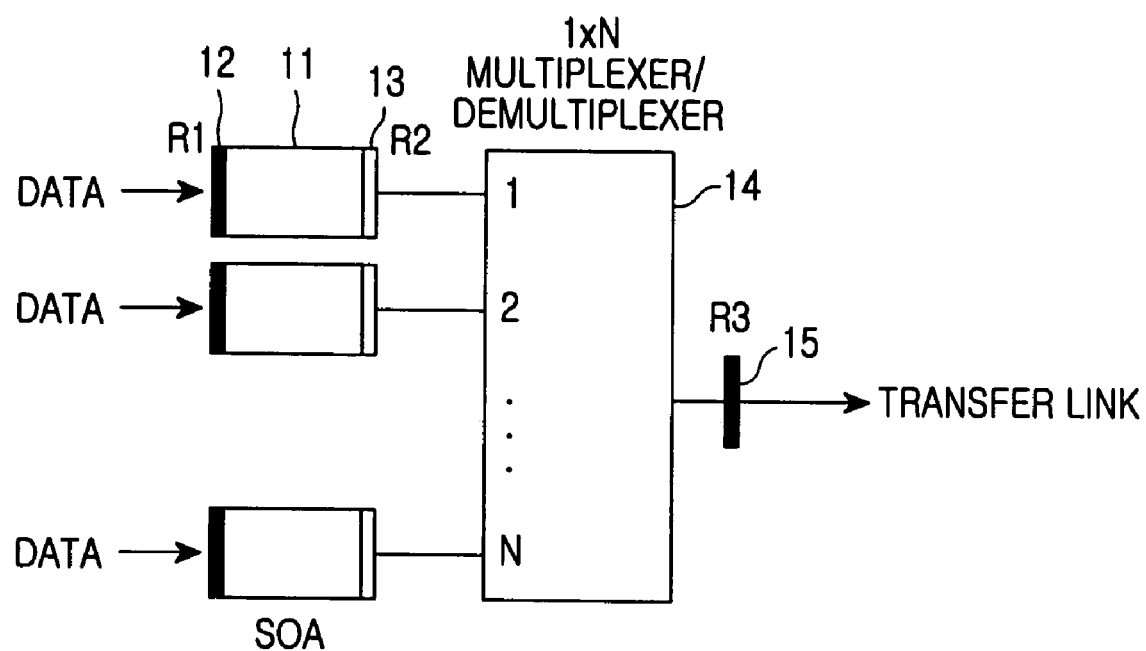
FIG. 1 is a block diagram of a WDM light source apparatus using a semiconductor optical amplifier in accordance with an embodiment of the present invention.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted when it may obscure the subject matter of the present invention.

FIG. 1 is a block diagram of a WDM light source apparatus using semiconductor optical amplifiers (SOAs) in accordance with an embodiment of the present invention. Referring to FIG. 1, the WDM light source apparatus includes N semiconductor optical amplifiers 11, a 1×N multiplexer/demultiplexer 14 for creating Gaussian-shaped frequency characteristics at its I/O (Input/Output) terminals, and a reflective mirror 15 (R3).

A reflection factor used to indicate the amount of light reflected by a mirror. A reflection factor of 1.5%, for example, implies that 98.5% of the transmitted light is absorbed while 1.5% is reflected. A value 100% describes a perfect mirror. Preferably the reflective mirror 15 has a high reflection factor in the range of more than 30%.

A WDM light source apparatus using a semiconductor optical amplifier (SOA) will hereinafter be described with reference to FIG. 1. One end of each SOA 11 is coated with a substance (R1) 12 having a high reflection factor in the range of more than 30%, the other end is coated with a substance (R2) 13 of an antireflection factor in the range of less than 0.1%. The SOAs 11 each generate a broadband signal shown in FIG. 2a. This broadband signal is transmitted to the substance (R2) 13, and is then transmitted to the 1×N multiplexer/demultiplexer 14 having Gaussian-shaped frequency characteristics at its I/O terminals.

Individual broadband signals received from N terminals of one end of the 1×N multiplexer/demultiplexer 14 are spectrum-sliced as shown in FIG. 2b. They are multiplexed as shown in FIG. 2c. They are then output to one terminal of the other end of the 1×N multiplexer/demultiplexer 14.

Most of multiplexed output signals are reflected from the reflection mirror (R3) 15, and are re-transmitted to one terminal of the 1×N multiplexer/demultiplexer 14. Some of multiplexed output signals may be selected from among all the multiplexed output signals to be transmitted to the substance (R3) 15, and are then transmitted to a data transfer link.

The signals re-transmitted to the 1×N multiplexer/demultiplexer 14 are demultiplexed, are applied to individual terminals of the 1×N multiplexer/demultiplexer 14, and are applied to the SOAs 11.

The signals applied to the SOAs 11 are amplified and reflected from the substance (R1) 12. The reflected signals from the substance (R1) 12 are output to the substance (R2) 13, and are applied to corresponding terminals of the 1×N multiplexer/demultiplexer 14.

Since the signals amplified at or output from individual SOAs 11 infinitely repeat the above procedures, the multiplexed signals output to the data transfer link after passing through the substance (R3) 15 become multiplexed signals of high-output optical signals each having a very narrow line width, as shown in FIG. 2d. These multiplexed signals are very similar to almost single-wavelength optical signals output from the DFB (Distributed FeedBack) laser described above.

The broadband signals created from the SOAs 11 are spectrum-sliced by the 1×N multiplexer/demultiplexer 14 having Gaussian-shaped frequency characteristics at 14's I/O terminals, and are sliced to be a spectrum having a Gaussian-shaped line width of A nm, and then repeatedly travel between the substance (R1) 12 and the substance (R3) 15, B number of times. In this case, if the broadband signals pass through the 1×N multiplexer/demultiplexer 14, 2B number of times, then the line width of the spectrum-sliced signal is reduced to be $A/\sqrt{2B}$, thereby creating such a signal waveform shown in FIG. 2d.

Accordingly, if the spectrum-sliced signals infinitely run between the substance (R1) 12 and the substance (R3) 15, a signal transmitted from the substance (R3) 15 to the data transfer link is changed to a narrow line width signal similar to an almost single-wavelength signal, thereby performing long distance transmission of high-speed data.

The SOAs 11 directly modulate their input signals according to high-speed data to be transmitted.

The 1×N multiplexer/demultiplexer 14 can be implemented with the WGR. Because the 1×N multiplexer/demultiplexer 14 generates a multiplexed signal having a wavelength bandwidth equal to that of the WGR, it can adjust the wavelength bandwidth by controlling temperature of the WGR, thereby controlling a wavelength bandwidth of the WDM signal applied to the data transfer link. Therefore, there is no need for each SOA to perform a temperature control function and a wavelength selection function.

Figure 2:
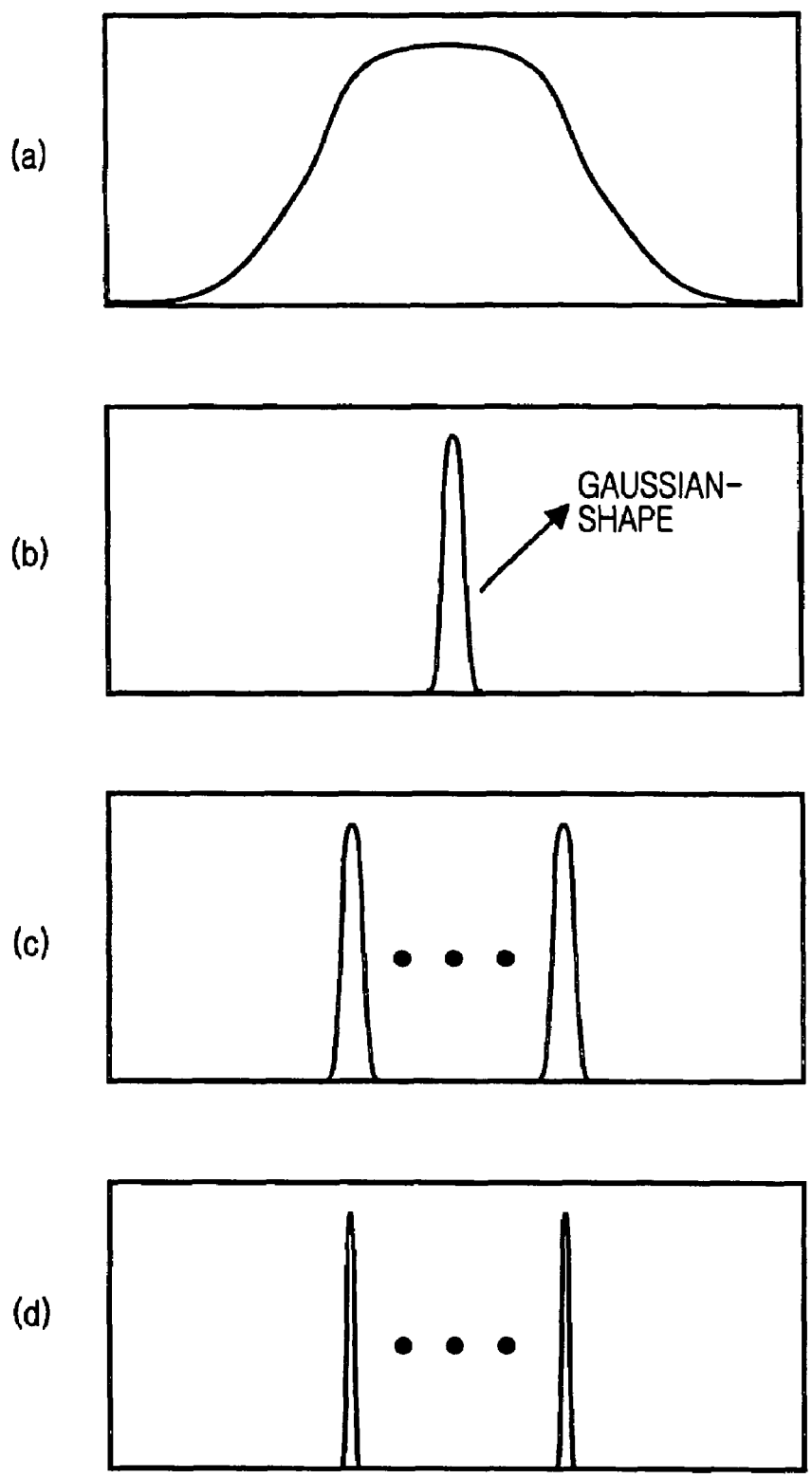
FIGS. 2a~2d depict waveform diagrams illustrating exemplary signals for every step in accordance with an embodiment of the present invention.

Referring again to FIGS. 2a-3d, FIG. 2a shows an exemplary bandband signal created from the SOA 11. FIG. 2b shows an exemplary spectrum-sliced signal created from the 1×N multiplexer/demultiplexer 14. FIG. 2c shows an exemplary spectrum-sliced multiplexed signal created from the 1×N multiplexer/demultiplexer 14. FIG. 2d shows an exemplary signal transmitted from the reflective mirror (R3) 15 having a high reflection factor to the data transfer link.

Figure 3:
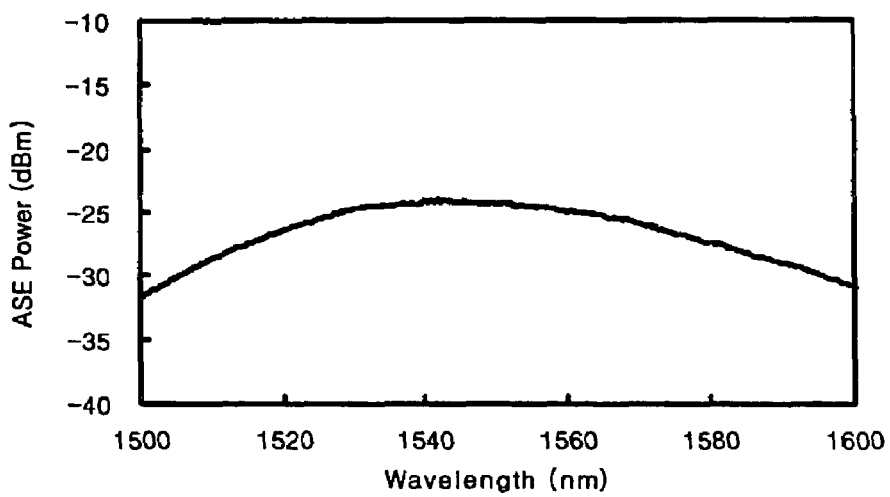
FIG. 3 depicts a waveform diagram illustrating an exemplary broadband signal shown in FIG. 2a generated from a semiconductor optical amplifier in accordance with an embodiment of the present invention.

FIG. 3 shows a waveform diagram of an exemplary broadband signal shown in FIG. 2a generated from the SOA 11 in accordance with an embodiment of the present invention. In FIG. 3, an X-axis indicates a wavelength (nm), and a Y-axis indicates output intensity (dBm). A driving current for use in the diagram of FIG. 3 is set to 200 mA.

Figure 4:
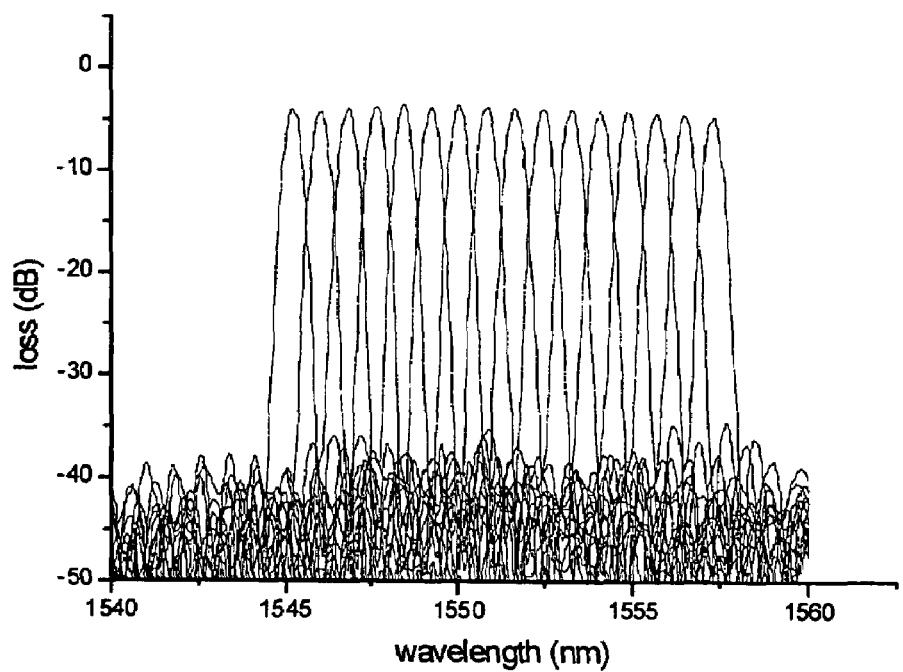
FIG. 4 is a waveform diagram illustrating exemplary pass band spectrum signals of individual terminals of a 1×16 Waveguide Grating Router (i.e., an example of a 1×N multiplexer/demultiplexer) in accordance with an embodiment of the present invention.

FIG. 4 is a waveform diagram illustrating exemplary pass band spectrum signals of individual terminals of a 1×16 WGR (i.e., an example of the 1×N multiplexer/demultiplexer 14) in accordance with an embodiment of the present invention. In FIG. 4, an X-axis indicates a wavelength, and a Y-axis is a loss value.

The WDM light source apparatus according to aspects of the present invention directly modulates an output signal of the SOA into another signal according to a high-speed data signal, such that there is no need for a high-priced additional modulator to be used.

Because the WDM light source apparatus outputs a multiplexed signal having a specific wavelength equal to that of the WGR, it can adjust a wavelength bandwidth by controlling the temperature of the WGR, thereby controlling a wavelength bandwidth of the WDM signal applied to the data transfer link. Therefore, there is no need for each SOA to perform a temperature control function and a wavelength selection function.

The WDM light source apparatus includes a laser cavity, both ends of which are coated with a high-reflection factor substance, which transmits only some output signals associated with a specific wavelength selected by a multiplexer/demultiplexer to the data transfer link, controls the remaining output signals other than the above signals to be continuously amplified at the laser cavity and at the same time repeatedly travel through a prescribed internal path, such that the SOA becomes operated at a saturation status and a high-output signal of a very narrow line width is transmitted to the data transfer link.

In addition, the SOAs according to aspects of the present invention can be economically manufactured with a low production cost similar to that of the Fabry-Perot lasers. This results in a cost-effective WDM light source apparatus using the SOA.

As apparent from the above description, if a WDM-PON system is configured in the form of a WDM light source apparatus using such a SOA, a CO (Central Office) transmits a multiplexed signal from the WDM light source apparatus to a local base station (also called a local office), and demultiplexes the multiplexed signal transmitted from the local base station to create an electrical signal. The local base station demultiplexes the multiplexed signal received from the CO, transmits the demultiplexed signal to individual subscriber ends, multiplexes signals received from individual subscriber ends, and transmits the multiplexed signals to the CO. The subscriber ends each convert an output signal of the local base station into an electric signal, convert the electric signal to be transmitted into an optical signal, and transmit the optical signal to the local base station.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A WDM (Wavelength Division Multiplexing) light source apparatus comprising:
N SOAs (Semiconductor Optical Amplifier) each having one end coated with a substance having a first reflection factor and the other end coated with a substance having a second reflection factor, the first reflection factor being higher than the second reflection factor, the N SOAs modulating respective input signals into optical signals according to a high-speed data signal to be transmitted, and amplifying the modulated signal;

a 1×N multiplexer/demultiplexer having one end composed of N terminals and the other end composed of one terminal, the N terminals coupled with the N SOAs; and a reflective mirror, connected to the one terminal of the 1×N multiplexer/demultiplexer, for reflecting a first portion of a signal received from the 1×N multiplexer/demultiplexer;

means for allowing each of the N SOAs to create a broadband signal, and outputting the N broadband signal to the end coated with the substance of second reflection factor;

means for applying N broadband signals to the N terminals contained in one side of the 1×N multiplexer/demultiplexer;

means for performing spectrum-slicing on individual broadband signals to create a multiplexed signal, and outputting the multiplexed signal to one terminal contained in the other side of the 1×N multiplexer/demultiplexer;

means for allowing the first portion of the signals from the means for performing spectrum-slicing to be reflected from the reflective mirror, re-transmitting the reflected signals to one terminal of the 1×N multiplexer/demultiplexer, means for applying selected signals from among all signals from the means for performing spectrum-slicing to the reflective mirror, and transmitting the selected signals to a data transfer link;

means for demultiplexing the signals retransmitted to the 1×N multiplexer/demultiplexer, and transmitting the multiplexed signals to each one end of the SOAs connected to the N terminals, the one end being coated with the substance of the second reflection factor; and means for amplifying signals received at the SOAs, reflecting the amplified signals from the second reflection factor substance, and re-transmitting the reflected signals to terminals connected to the 1×N multiplexer/demultiplexer through the one end coated with the second reflection factor substance.

2. The apparatus as set forth in claim 1, wherein the signals transmitted to the data transfer link have a narrow line width approaching a single-wavelength.

3. The apparatus as set forth in claim 2, wherein the line widths of the optical signals are calculated using an equation "each line width=$A/\sqrt{2B}$", where A is a Gaussian signal line width changing with frequency band characteristics of the 1×N multiplexer/demultiplexer, and B is a number of times during which the optical signals travel between the SOAs' ends coated with the first reflection factor substance and the reflective mirror.

4. The apparatus as set forth in claim 1, wherein the 1×N multiplexer/demultiplexer is a WGR (Waveguide Grating Router).

5. A method for a WOM (Wavelength Division Multiplexing) light source apparatus, the apparatus including N SOAs each having one end coated with a substance having a first reflection factor and the other end coated with a substance having an second reflection factor, the first reflection factor being higher than the second reflection factor, a 1×N multiplexer/demultiplexer having one end composed of N terminals and the other end composed of one terminal, the N terminals coupled with the N SOAs; and a reflective mirror, connected to the one terminal of the 1×N multiplexer/demultiplexer, the method comprising the steps of:

a) allowing each of the N SOAs to create a broadband signal, and outputting the broadband signal to the end coated with the substance of second reflection factor;

b) applying N broadband signals created at the step (a) to the N terminals contained in one side of the 1×N multiplexer/demultiplexer;

c) performing spectrum-slicing on individual broadband signals received at the step (b) to create a multiplexed signal, and outputting the multiplexed signal to one terminal contained in the other side of the 1×N multiplexer/demultiplexer;

d) allowing a first portion of the output signals at the step (c) to be reflected from the reflective mirror, re-transmitting the reflected signals to one terminal of the 1×N multiplexer/demultiplexer, applying a second portion of the output signals selected from among all output signals of the step (c) to the reflective mirror, and transmitting the output signal signals to a data transfer link;

e) demultiplexing the signals retransmitted to the 1×N multiplexer/demultiplexer and transmitting the multiplexed signals to each one end of the SOAs connected to the N terminals, the one end being coated with the substance of second reflection factor;

f) amplifying signals received at the SOAs, reflecting the amplified signals from the second reflection factor substance, and re-transmitting the reflected signals to terminals connected to the 1×N multiplexer/demultiplexer through the one end coated with the second reflection factor substance; and g) repeating the steps (a) to (f).

* * * * *